United States Patent [19]
Moreau

[11] Patent Number: 5,658,150
[45] Date of Patent: Aug. 19, 1997

[54] THREE-DIMENSIONAL TEACHING AID FOR USE IN DEVELOPING STORY TELLING SKILLS

[75] Inventor: Maryellen Rooney Moreau, Easthampton, Mass.

[73] Assignee: Discourse Skills Production, Inc., Easthampton, Mass.

[21] Appl. No.: 375,776

[22] Filed: Jan. 20, 1995

[51] Int. Cl.⁶ .................................................. G09B 19/00
[52] U.S. Cl. ........................... 434/156; 434/433; 434/112
[58] Field of Search ................................. 434/178, 236, 434/433, 112, 167, 170, 172, 245, 246, 156; 446/385, 268; 63/15; 428/4, 32

[56] References Cited

U.S. PATENT DOCUMENTS

| | | | |
|---|---|---|---|
| 1,874,881 | 8/1932 | Brown | 428/4 X |
| 4,179,833 | 12/1979 | Knodel . | |
| 4,201,806 | 5/1980 | Cole | 428/4 |
| 4,351,166 | 9/1982 | Belin | 63/15 |

FOREIGN PATENT DOCUMENTS 368652   5/1963   Switzerland ........................ 434/246

OTHER PUBLICATIONS

The "Centennary" Rosary (Pamphlet), Received in PTO May 25, 1956; 434/246 1954.

*Primary Examiner*—Jeffrey A. Smith
*Attorney, Agent, or Firm*—McCormick, Paulding & Huber

[57] ABSTRACT

A tactile teaching aid adapted to improve a person's discourse skills includes a braided strand having a plurality of indicia secured thereto that represent the elements of a story. The indicia are disposed along the strand from an upper to lower portion of the braid in the sequential order of the elements of a logical, comprehensive story. The elements of a story, in sequential order, are the characters represented: (by a pom-pom), the setting (by a star), the initiating event or problem (by a shoe), an internal response of the character to the problem (by a heart), a plan by the character to solve the problem (by a hand), the actions by the character to carry out the plan (by a plurality of beads), the direct consequences of the action (by a bow), and the resolution of the problem (by a plurality of beaded hearts).

20 Claims, 1 Drawing Sheet

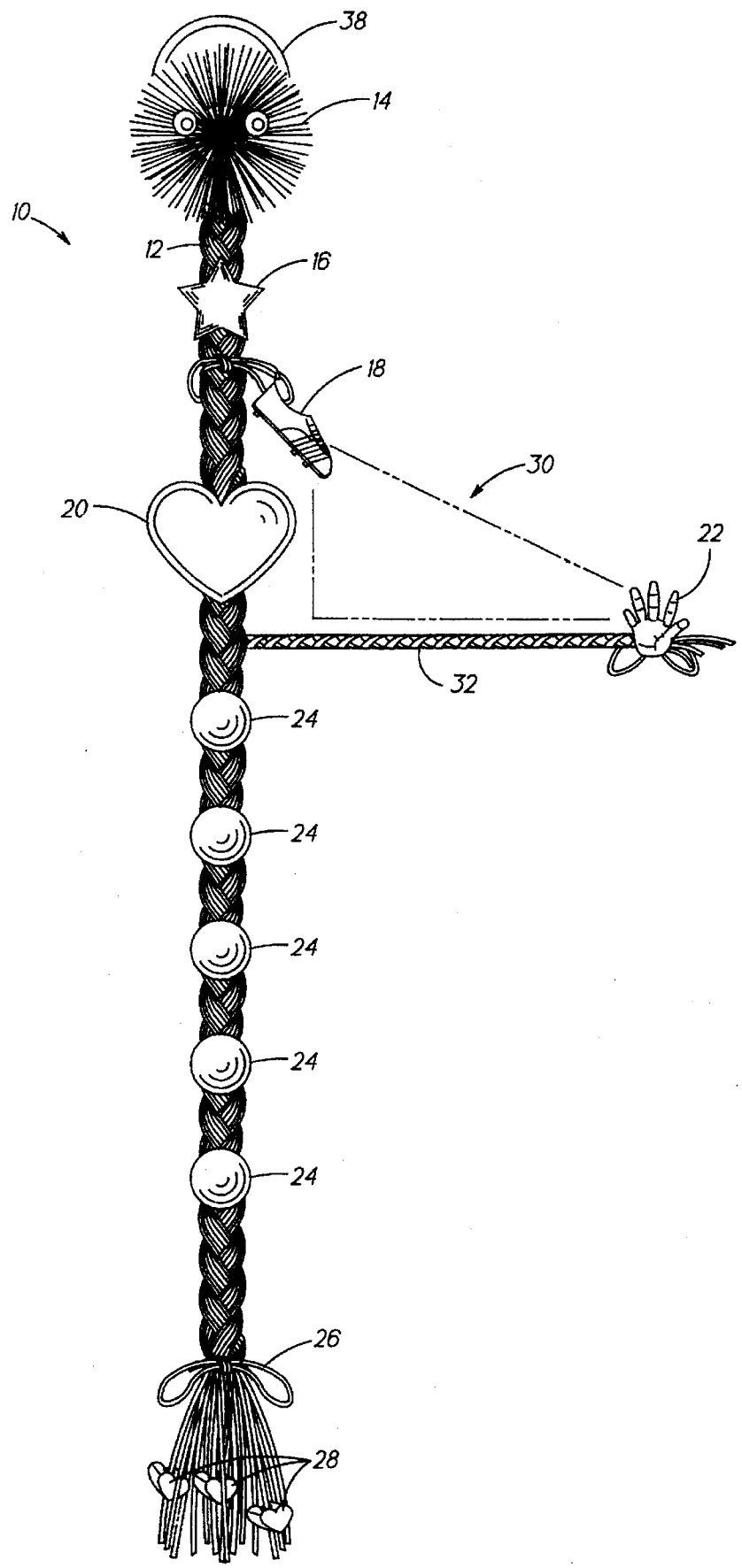

THREE-DIMENSIONAL TEACHING AID FOR USE IN DEVELOPING STORY TELLING SKILLS

FIELD OF THE INVENTION

This invention relates to a teaching aid and more particularly a three-dimensional teaching aid for improving a person's narrative or discourse skills.

BACKGROUND OF THE INVENTION

Narrative or discourse skills relate to one's ability or faculty of thinking logically and speech and writing competency is directly related to the proficiency of the discourse skills of such person. Individuals who have difficulty in organizing their thoughts are usually unable to express their thoughts or ideas logically, coherently and persuasively. It has been found that as an individual's discourse skills improve, that person will be better able to speak and write in a convincing and forceful manner.

Children and handicapped persons who may be lacking the necessary discourse skills, tend to write or narrate shorter, less complete and less well organized stories without the aid of others prompting them by asking leading questions to draw out important aspects of the story. When such persons hear or read a story, there is frequently a tendency for them to confuse the trivial with the important aspects of the story and to draw inappropriate inferences and conclusions.

SUMMARY OF THE INVENTION

Accordingly, it is the primary object of the present invention to provide an inexpensive teaching aid to assist in improving story telling skills.

It is another object to provide a teaching aid to assist in evaluating the level of a student's or person's discourse skills and tracking the improvement thereof.

According to the present invention, a teaching aid for use in developing story telling skills comprises an elongated flexible member having an upper and lower end portion with a plurality of symbols, indicators or indicia disposed at spaced locations on said elongated member to represent elements of a story which include one of said indicia representing the primary character of the story disposed adjacent the upper end of the flexible member or strand; a second of said indicia representing an incident in the story which affects the character in some significant way, disposed in spaced relation to the first of said indicia toward the lower end of the flexible member; and at least one other of said indicia representing an action taken by the character to resolve the problem, disposed below the second symbol and representing a response thereto.

The above and other objects and advantages of this invention will become more readily apparent when the following description is read in conjunction with the accompanying drawings.

BRIEF DESCRIPTION OF THE DRAWINGS

FIG. 1 is an elevational view of a teaching aid of the type embodying the present invention.

DETAILED DESCRIPTION OF THE PREFERRED EMBODIMENTS

Individuals who have deficient discourse skills, such as children and handicapped persons, have a difficult time organizing their thoughts to be able to logically express them verbally or in writing. The preferred embodiment of the learning tool 10, illustrated in the FIGURE, assists a person with describing, in the proper sequence, the elements of a story to formulate an organized and logical story.

The learning tool 10 comprises a flexible strand or braid 12 formed of a plurality of strings or yarn strands to provide a means to interconnect a plurality of indicia, each of which represent the basic elements of a narrative or story. The indicia may include, for example, a pom-pom 14, a star 16, a shoe or sneaker 18, a heart 20, a hand 22, a plurality of beads 24, a bow 26, and a plurality of beaded hearts 28; and are preferably disposed along the braid in that order. The order of the indicia along the braid corresponds to the sequence that each element of a story should be described when telling or writing a story.

Starting at the upper end of the braid 12, the indicia are consecutively attached thereto beginning with the pom-pom 14 and ending with the beaded hearts 28 attached at the lower end of the braid. The star 16 and heart 20 may be removably secured to the braid 20 by any fastening means (not shown), such as a hook and loop. The hand 22 is attached to the braid 12 by a laterally extending string or braid 32 so that when extended, provides the one of the three (3) corners of a critical thinking triangle 30, to be more fully described hereinafter. The use of this type of geometric pattern associated with the elements of the shoe 18, the heart 20 and the hand 22, serves as a memory aid so that such persons will more likely recall the importance of those indicia in a particular story about which they are learning. The inner diameter of the holes of the beads 24 are less than the thickness of the braid 12 so that the beads remain vertically spaced along the braid. A string is secured to the lower portion of the braid 12 just below the beads 24 to provide the bow 26 which also secures the ends of the braids together. Below the bow 26, each of the beaded hearts 28 is threaded onto a single strand of the braid 12 and retained in place by tying the strand into a knot or to another strand.

It has been found that most stories or narratives can be broken down to eight (8) basic elements that, when described in the proper sequence, produces a comprehensive and orderly story. The learning tool compartmentalizes a narrative or story to enable a person to logically tell or write a story. This compartmentalization also helps a person to break down a story that he/she has heard or read into these specific elements, thus enabling the person to better comprehend and remember the story.

In the preferred embodiment, the first element of the story, represented by the pom-pom 14, is the main character. The second element, represented by the star 16, is the setting. The third element, represented by the shoe 18, is the initiating event or problem. The fourth element, represented by the heart 20, is the internal or emotional response of the character to the initiating event. The fifth element, represented by the hand 22, is the character's plan to address the internal response to the initiating event. The sixth element, represented by a plurality of beads 24, is the character's actions to carry out the plan. The seventh element, represented by the bow 26, is the direct consequence of the characters action. The eighth element, represented by the beaded hearts 28, is the resolution of the initiating event or problem.

The initiating event (the shoe 18), the internal response (the heart 20), and the plan (the hand 22) form the critical thinking triangle 30. The critical thinking triangle 30 highlights the relationship among the initiating event, the internal response and the plan to answer the "why" and "how" questions that are important to understanding a story. For instance, "Why is the character doing this?" and "How should the character resolve this problem?"

The learning tool 10 may be used by a person as a prompt and reminder of the elements of a story and their sequence when writing or recounting a story that the person has heard or read. The person would begin at the top of the learning tool 10 and point his/her finger at the pom-pom 14 and answer the question "Who is the story about?" Second, the person would point to the star 16 and answer the question "Where does the story take place?" Third, the person would point to the shoe 18 and answer the question "What problem is encountered by the character which causes him to initiate a response?" Fourth, the person would point to the heart 20 and answer the question "How does the character feel about this event?" Fifth, the person would extend the hand 22 perpendicular to the braid to form the critical triangle 30 and answer the question "What will the character do?" Extension of the hand also prompts the person to think and understand why the character is taking those following actions. Sixth, the person would move or point to the first bead 24 and answer the question "How does the character try to solve the problem created by the initiating event?" Seventh, the person points to the bow 26 and answers the question "What happens as a result of the character's action?" Eighth, the person points to the beaded hearts 28 and answers the question "How does the character feel about the consequences?" If the character is not happy with the consequence of that action, the person would repeat the steps six (6) through eight (8) until the character resolves the problem created by the initiating event.

The following is an example of how a story may be written using the three-dimensional teaching aid of the present invention:

MAIN CHARACTER: Big Al was a friendly fish who was nice, but very, very scary in outward appearance. Big Al was friendless.

SETTING: Wide blue sea.

INITIATING EVENT: Big Al was ignored by his peers because he looked different.

INTERNAL RESPONSE: Big Al was lonely and sad because he had no friends.

PLAN: Big Al wanted friends, so he worked at it.

ACTION: He tried wrapping himself up in seaweed as a disguise, but this didn't work.

ACTION: He puffed himself up round, but this didn't work.

ACTION: He covered himself up with sand at the bottom of the sea, but this didn't work.

ACTION: He changed his color, but this didn't work.

ACTION: He rescued the other fish from danger and was almost captured. This worked!

DIRECT CONSEQUENCE: Big Al had many friends.

RESOLUTION: He is happy and not lonely any more.

The learning tool 10 not only provides a manipulative tool invoking a tactile response by the user to prompt and remind individuals how to write or tell a logical story, it also provides a fun and entertaining tool to assist children or handicapped persons with learning. Children may personalize their learning tool 10 by decorating the pom-pom 14 with a face and hair and then naming it. A ring 38 may also be attached to the upper end of the braid 12 to provide a means to hang or hold the teaching aid 10.

The learning tool 10 is also useful for teachers in a classroom setting. A teacher may also use the tool 10 to prompt the students for a description of the next element of the story by pointing to each of said indicia. In addition, the teacher may remove the star 16 and the heart 20 from the braided strands 12, distribute the same to students in the class and ask them to discuss some portion or aspect of the story that is represented by the symbol or indicator they are holding. Upon correctly relating the portion of the story which was assigned to that student, that person would then place the symbol in the appropriate location on the braid 12.

The learning tool 10 also provides a teacher with a visual means to evaluate a student's level of discourse skills. An individual's discourse skill is reflected by that person's ability to develop stories which incorporate each element of the learning tool 10. As a person's ability improves, he or she will progressively use or describe each element of the learning tool. For instance, a pre-schooler may tell a story which simply describes the character (the pom-pom 14) and setting (the star 16), while an early elementary student may tell a story which describes the character (the pom-pom 14), the setting (the star 16), the initiating event (the shoe 18), the character's internal response (the heart 20), and the consequence (the bow 26) of the internal response. By using the learning tool 10 to identify a student's deficiencies of discourse skill, a teacher may take the appropriate steps to improve that person's discourse skill.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. A three-dimensional teaching aid for use by an individual in developing story telling skills comprising an elongated flexible member having an upper end portion having an upper terminal end representing a beginning of a story and a lower end portion having a lower terminal end representing an end of the story with a plurality of indicia disposed at spaced locations along said flexible member, each of said indicia, being distinct from one another, represent an element of the story, said plurality of indicia including a first of said indicia having physical characteristics for visually reminding the individual of an element of the story pertaining to the primary character of the story, said first indicia disposed adjacent said upper end of said flexible member; a second of said indicia having physical characteristics for visually reminding the individual of an element of the story pertaining to an incident in the story which affects the character in some significant way, said second indicia disposed in spaced relation to the first of said indicia toward said lower end of said flexible member; and a third of said indicia having physical characteristics for visually reminding the individual of an element of the story pertaining to a response by the character to the incident, said third indicia disposed below the second of said indicia, the plurality of indicia being ordered along said member relative to each other in a sequence which corresponds to a sequence that each element of the story should be described when telling the story from the beginning to the end.

2. A three-dimensional teaching aid, as set forth in claim 1, and wherein the flexible member is formed of a plurality of strands of material braided together.

3. A three-dimensional teaching aid, as set forth in claim 1, and wherein the first of said indicia is a pom-pom.

4. A three-dimensional teaching aid, as set forth in claim 1, and wherein the second of said indicia is in the form of a shoe.

5. A three-dimensional teaching aid, as set forth in claim 1, and wherein the third of said indicia is a bead.

6. A three-dimensional teaching aid, as set forth in claim 1, further comprising a plurality of other indicia, similar to said third indicia, disposed below the third of said indicia, each of the other indicia having physical characteristics for visually reminding the individual of an element of the story pertaining to another distinct response by the character to the incident.

7. A three-dimensional teaching aid, as set forth in claim 1, further includes a fourth of said indicia, representing the setting of the story, disposed between first and second of said indicia.

8. A three-dimensional teaching aid, as set forth in claim 7, and wherein the fourth of said indicia is in the form of a star.

9. A three-dimensional teaching aid, as set forth in claim 7, and wherein the fourth of said indicia is releasably secured to said flexible member.

10. A three-dimensional teaching aid, as set forth in claim 1, further includes a fifth of said indicia having physical characteristics for visually reminding the individual of an element of the story pertaining to the emotional response of the character to the problem, said fifth indicia disposed between the second and third of said indicia.

11. A three-dimensional teaching aid, as set forth in claim 10, and wherein the fifth of said indicia is in the form of a heart.

12. A three-dimensional teaching aid, as set forth in claim 11, and wherein the fifth of said indicia is releasably secured to said flexible member.

13. A three-dimensional teaching aid, as set forth in claim 10, further includes a sixth of said indicia having physical characteristics for visually reminding an individual of an element of the story pertaining to a plan by the character in response to the incident, said sixth indicia disposed between said fifth and third indicia.

14. A three-dimensional teaching aid, as set forth in claim 13, and wherein the sixth of said indicia is in the form of a hand.

15. A three-dimensional teaching aid, as set forth in claim 13, and wherein the sixth indicia is secured to said flexible member extending therefrom for orientation at various angles thereto and when placed in normal relation thereto, will partially define a portion of a triangle with said second and fifth indicia for visually reminding the individual of the elements of the story represented by the relationship between the second fifth and sixth indicia.

16. A three-dimensional teaching aid, as set forth in claim 1, further includes a seventh of said indicia having physical characteristics for visually reminding the individual of an element of the story pertaining to the direct consequences of the response of the character, said seventh indicia disposed below the third of said indicia.

17. A three-dimensional teaching aid, as set forth in claim 16, and wherein the seventh of said indicia is a bow.

18. A three-dimensional teaching aid, as set forth in claim 1, further includes an eighth of said indicia having physical characteristics for visually reminding an individual of an element of the story pertaining to the resolution of the incident, said eighth indicia disposed below the seventh of said indicia.

19. A three-dimensional teaching aid, as set forth in claim 18, and wherein the eighth of said indicia is a beaded heart.

20. A three-dimensional teaching aid for use in developing story telling skills comprising:

an elongated flexible member having an upper end portion having an upper terminal end representing a beginning of a story and a lower end portion having a lower terminal end representing an end of the story;

first means having physical characteristics for reminding an individual of an element of the story pertaining to a primary character of the story, said first means disposed adjacent said upper end of said flexible member;

second means having physical characteristics for reminding an individual of an element of the story pertaining to an incident in the story which affects the primary character in some significant way, said second means disposed in spaced relation to said first means toward said lower end of said flexible member; and third means having physical characteristics for reminding an individual of an element of the story pertaining to a response by the primary character to the incident of the story, said third means disposed in spaced relation below the second means, each of said means being distinct from one another and being ordered along said member relative to each other in a sequence which corresponds to a sequence that each element of the story should be described when telling the story from the beginning to the end.

* * * * *